United States Patent [19]

Wakimoto

[11] Patent Number: 5,177,642
[45] Date of Patent: Jan. 5, 1993

[54] MANUALLY OPERATED REMOTE CONTROL TYPE DOOR MIRROR

[75] Inventor: Fumiyoshi Wakimoto, Miyazaki, Japan

[73] Assignee: Honda Lock Mfg. Co., Ltd., Japan

[21] Appl. No.: 841,037

[22] Filed: Feb. 25, 1992

[30] Foreign Application Priority Data

Feb. 28, 1991 [JP] Japan .................. 3-37406[U]

[51] Int. Cl.⁵ .............................................. G02B 7/18
[52] U.S. Cl. .................... 359/844; 359/875; 359/882; 248/481; 248/484
[58] Field of Search .............. 359/844, 872, 873, 875, 359/882; 248/479, 481, 483, 484

[56] References Cited

U.S. PATENT DOCUMENTS 4,660,944  9/1987  Suzuki et al. ............... 359/872

FOREIGN PATENT DOCUMENTS 61-122047  6/1986  Japan ................... 359/879
61-195653  3/1988  Japan ................... 359/875

Primary Examiner—Bruce Y. Arnold
Assistant Examiner—J. P. Ryan
Attorney, Agent, or Firm—Longacre & White

[57] ABSTRACT

A manually operated remote control type door mirror having a base unit and a bracket unit which are separate from each other and can be assembled integrally, wherein the base unit comprises an attaching stay to be attached on the side of a vehicle body, a base extended from the attaching stay, a manipulation lever supported turnably to the attaching stay with one end being protruded to the inside of the vehicle body and with the other end being exposed to the inside of a recess formed in the base, and the bracket unit comprises a cylindrical member having one end to be combined with the recess of the base and a shaft having one end extended from the cylindrical member a bracket supported to the cylindrical member and a mirror tiltably held to the bracket and connected by way of a link mechanism to the mirror and the other end. The bracket unit can be assembled with the base unit easily by placing one end of the cylindrical member in the recess of the base while connecting the other end of the shaft to the other end of the manipulation lever.

5 Claims, 4 Drawing Sheets

MANUALLY OPERATED REMOTE CONTROL TYPE DOOR MIRROR

BACKGROUND OF THE INVENTION

1. Field of the Invention

The present invention concerns a door mirror used for a motor vehicle and, more in particular, it relates to a manually operated remote control type door mirror adapted to tilt a mirror by an operation applied to a manipulation lever from the inside of the vehicle.

2. Description of the Prior Art

Existent door mirrors of the aforementioned type have been disclosed in, for example, Japanese Patent Laid Open Sho 61-122047, as well as U.S. Pat. Nos. 4,636,045, 4,660,944 and 4,783,161. In such prior art, a mirror is tiltable forward-to-backward and rightward-to-leftward by operating a manipulation lever protruded to the inside of a motor vehicle and transmitting the operation by way of a link mechanism to a mirror.

However, in the existent manually operated remote control type door mirrors, since the link mechanism for interlocking the manipulation lever with the mirror is complicate, a bracket for supporting the mirror is previously assembled integrally to a mirror base which is to be fixed on the side of a vehicle body and, subsequently, the link mechanism is attached to them. This involves a problem that the efficiency of assembling operation such as for the link mechanism is poor.

OBJECT OF THE INVENTION

It is, accordingly, an object of the present invention to provide a manually operated remote control type door mirror with an improved efficiency for the assembling operation and capable of exchanging parts for the door mirror more easily.

SUMMARY OF THE INVENTION

The foregoing object of the present invention can be attained by:

a manually operated remote control type door mirror adapted to tilt a mirror by an operation applied to an manipulation lever from the inside of a vehicle, characterized by providing a base unit and a bracket unit which are separate from each other and can be assembled integrally, wherein the base unit comprises an attaching stay to be attached on the side of a door of a vehicle body, a base extended from the attaching stay and having a recess opened outward, a manipulation lever supported turnably to the attaching stay with one end of the lever being protruded to the inside of the vehicle body and with the other of the lever end being exposed to the inside of the recess of the base, and the bracket unit comprises a cylindrical member having one end that can be received in the recess of the base, a shaft mounted to the cylindrical member rotatably and axially movably with one end thereof being led out from the cylindrical member, a bracket supported on the cylindrical member, and a mirror tiltably held to the bracket and connected by way of a link mechanism to the other end of the shaft, whereby the bracket unit can be assembled with the base unit by placing one end of the cylindrical member in the recess of the base while connecting the other end of the shaft to the other end of the manipulation lever.

In accordance with the present invention, the door mirror can be assembled when the separately provided bracket unit and the base unit are combined together, by placing one end of the cylindrical member of the former unit into the recess of the base of the latter unit while connecting the other end of the shaft member with the other end of the manipulation lever. Therefore, this can provide an excellent effect capable of improving the efficiency for the assembling operation, in particular, for the link member. Further, since the bracket unit can be exchanged, if it is necessary, while leaving the base unit being mounted as it is to the vehicle body, parts of the door mirror can be exchanged more easily.

BRIEF DESCRIPTION OF THE ACCOMPANYING DRAWINGS

These and other objects, as well as advantageous features of the present invention will become apparent by reading the following descriptions for the preferred embodiment according to the present invention with reference to the accompanying drawings, wherein FIG. 1 is an exploded perspective view, partially in cross operation, of a manually operated remote control type door mirror according to the present invention;

FIGS. 2 and 3 are, respectively, assembled views thereof partially in cross section, and FIG. 4 is an explanatory view of illustrating an angle control operation of the manually operated remote control type door mirror according to the present invention.

DESCRIPTION OF THE PREFERRED EMBODIMENTS

Figure 1:
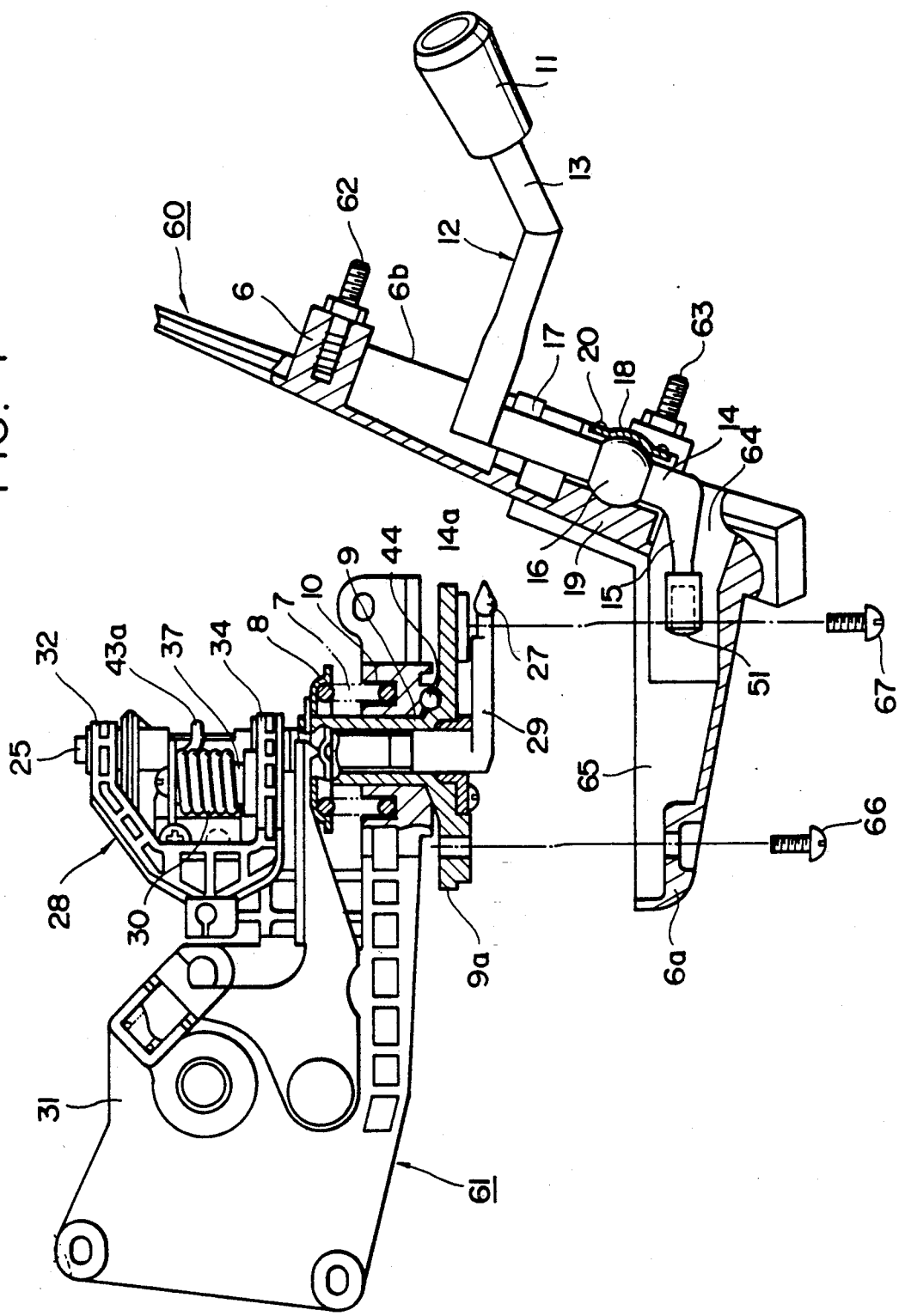
Figure 2:
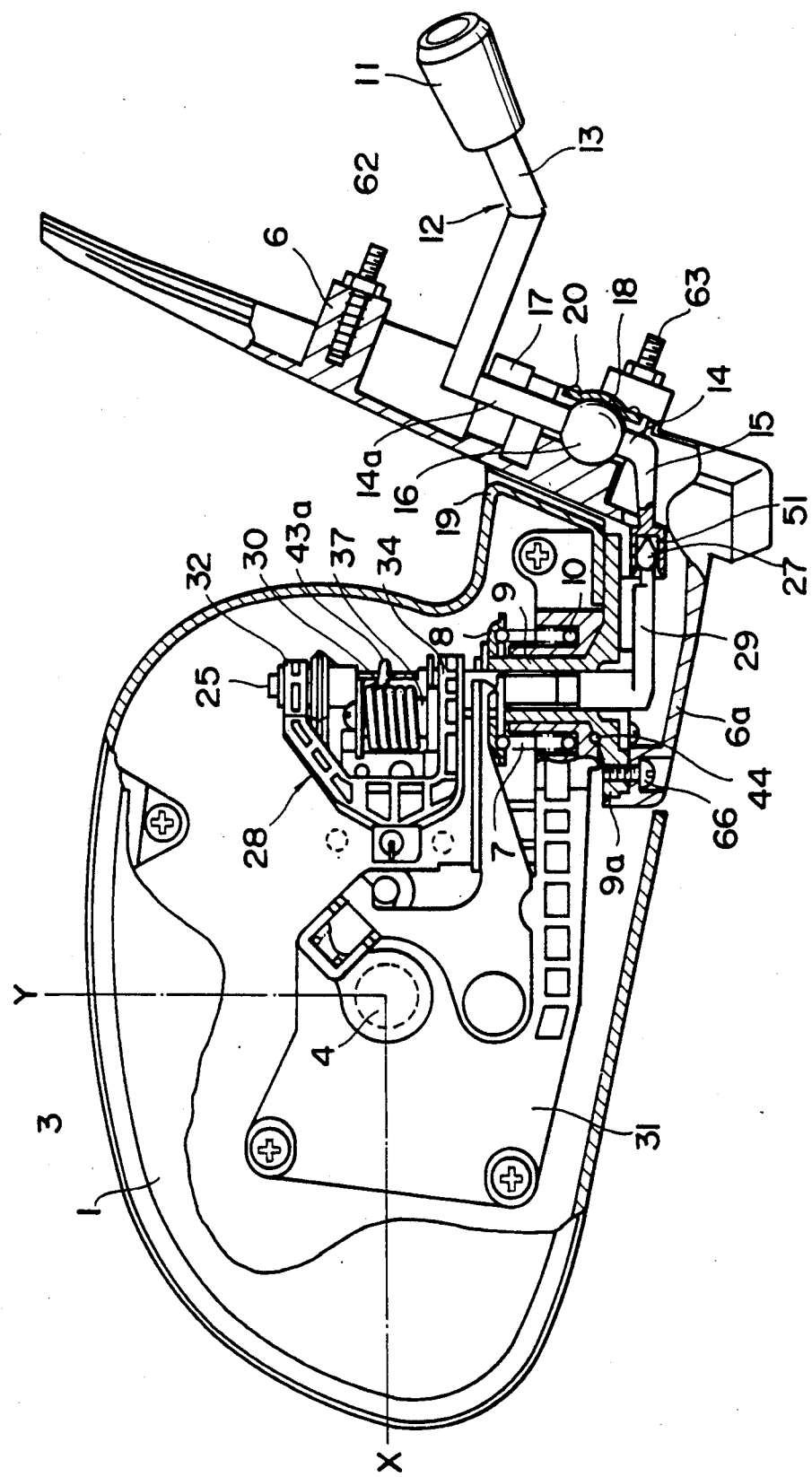
Figure 3:
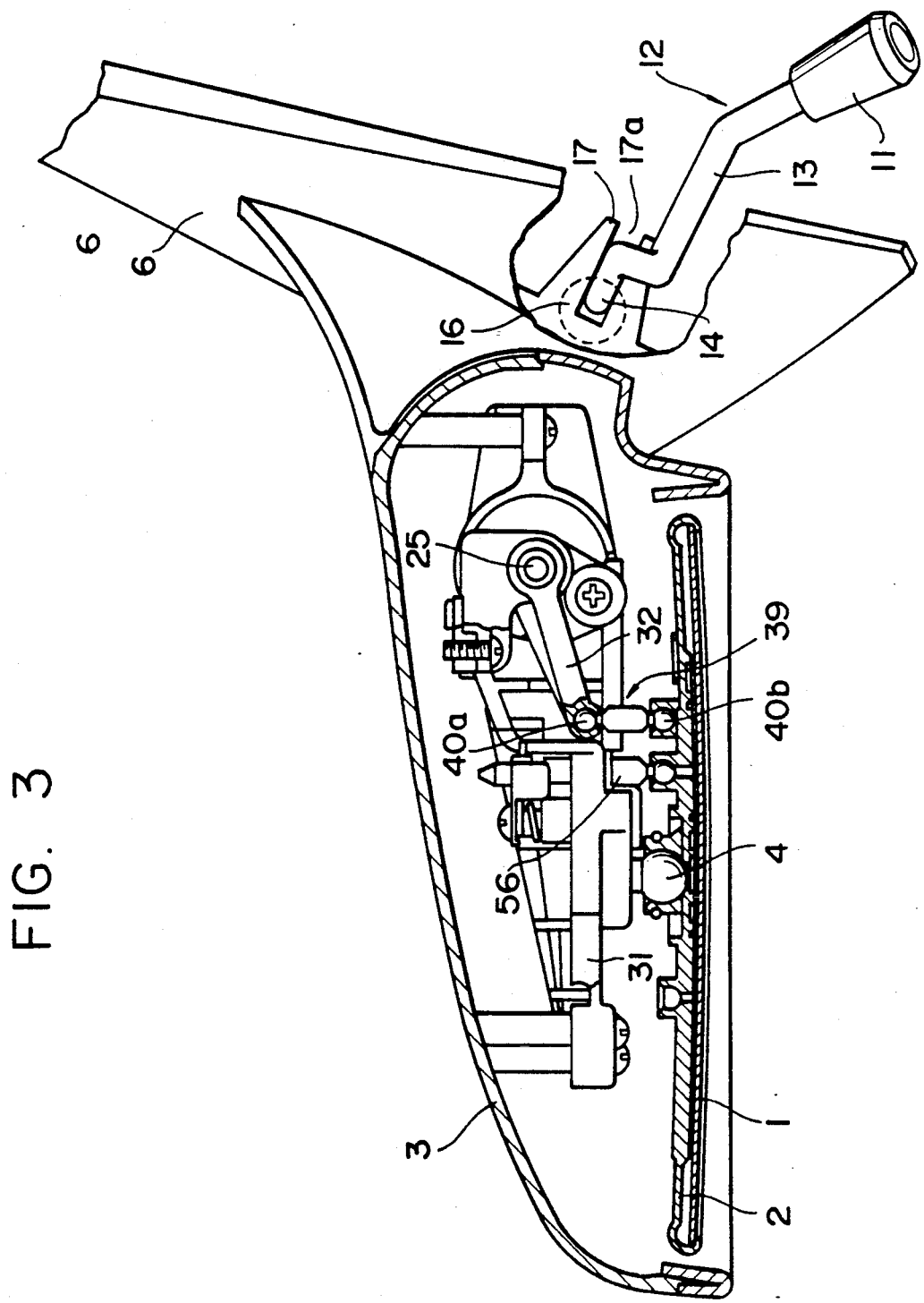

As shown in the drawings, particularly, in FIGS. 1, 2 and 3, a mirror 1 is held by a mirror holder 2, and the mirror holder 2 is supported by a ball pivot 4 on a bracket 31. The mirror 1 is tiltable by a rotational stopper lever 56 around a horizontal axis X and a vertical axis Y. A mirror visor 3 is fixed to the bracket 31.

Figure 4:
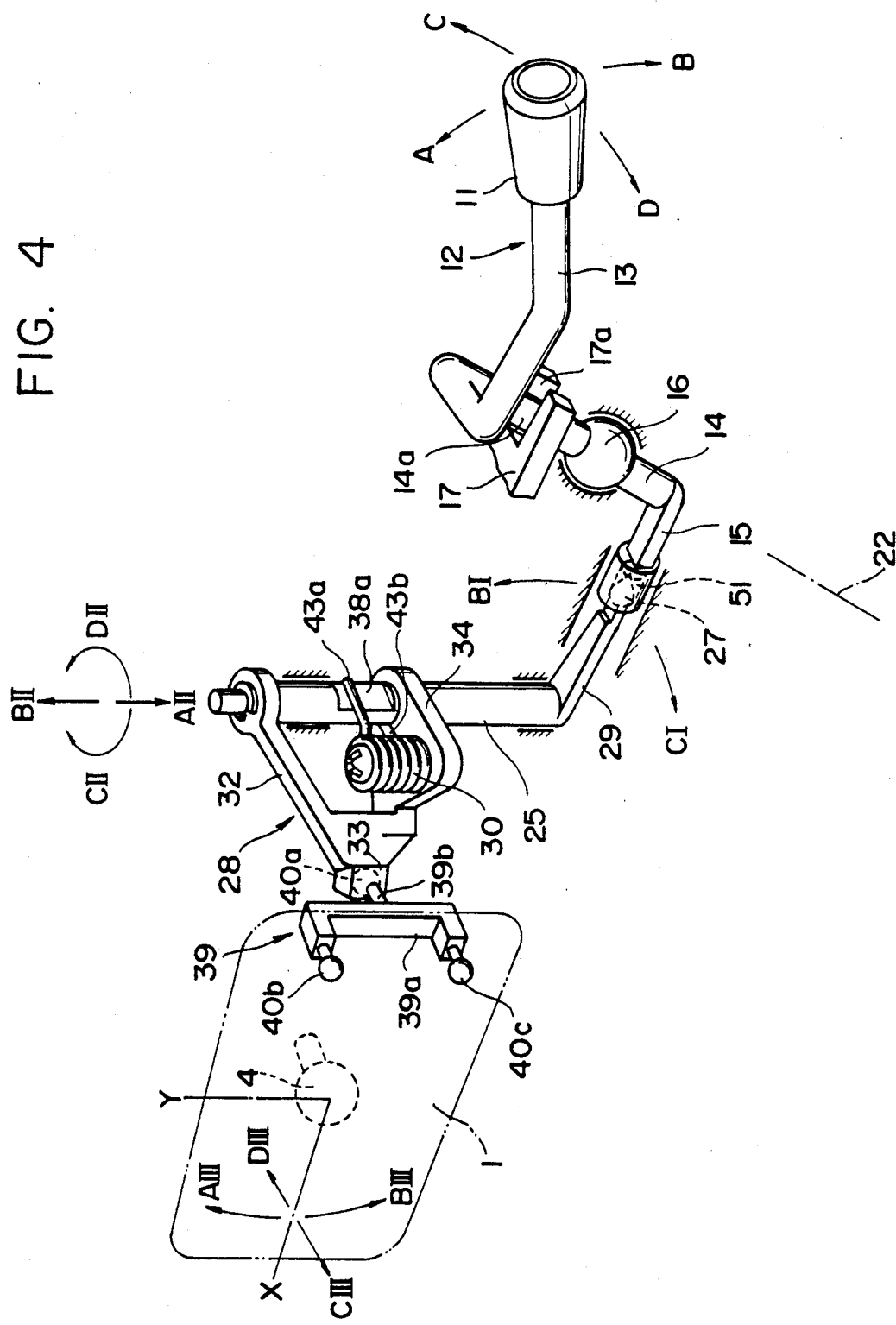

As shown in FIG. 1 to FIG. 3, a base unit 60 comprises an attaching stay 6 to be attached to the surface of a vehicle on the side of a door, a base 6a protruded outward from the lower end of the attaching stay 6 and having a recess 65 opened upward and a manipulation lever 12 attached to the attaching stay 6 such that the lever can be turned freely. An insertion hole 64 is formed to the recess 65 in communication with a surface 6b at which the attaching stay 6 is attached to a vehicle body. Setting bolts 62 and 63 are to be secured to the attaching surface 6b. The manipulation lever 12 protrudes into a vehicle chamber and comprises a manipulation rod 13 having a knob 11 at its protruding end, a vertical rod 14 extended downward from the other end of the manipulation rod 13 and supported in the stay 6 and a swing lever 15 extended from the lower end of the vertical rod 14, passed through the insertion hole 64 and then exposed to the inside of the recess 65. The swing lever 15 has a cylindrical bore 51 formed at the top end thereof for receiving the extended end of a lower end arm 29 to be described later. The vertical rod 14 has a fulcrum ball 16 about at the longitudinal center thereof and the fulcrum ball 16 is held by bearings 18 and 19. The bearing 19 on one side is formed integrally with the attaching stay 6, while the bearing 18 on the other side is coupled by means of male screws 20 to the bearing 19. Further, the attaching stay 6 has a guide member 17 formed integrally therewith and having a V-shaped guide groove 17a (refer to FIG. 4). An upper portion 14a of the vertical rod 14 situated above the fulcrum ball 16 is received in the guide member 17.

A bracket unit 61 comprises a cylindrical member 9 having a flanged portion 9a at its lower end, a shaft 25 loosely fit around the cylindrical member 9 a bracket 31 pivoted to the cylindrical member 9 and. A coil spring 7 is wound around the outer circumference of the cylindrical member 9. The coil spring 7 is maintained being compressed between a retainer plate 8 engaged to the upper surface of the cylindrical member 9 and the bottom of an annular groove 10 of the bracket 31. Thus, the bracket 31 is resiliently supported on a flanged portion 9a by way of a plurality of ball clutches 44 disposed between the lower surface of the bracket 31 and the flanged portion 9a of the cylindrical member 9.

A lower end arm 29 is formed integrally to the lower end of the shaft 25 and it extends in a horizontal direction. A ball pivot 27 is formed to the extended end of the lower end arm 29. When the flanged portion 9a of the cylindrical member 9 is combined into the recess 65 of the base 6a, the ball pivot 27 is engaged into the cylindrical bore 51 of the swing lever 15. When the swing lever 15 and the lower end arm 29 are connected in this way, the movement of the swing lever 15 caused by the operation to the manipulation lever 12 can be transmitted by way of the lower end arm 29 to the shaft 25.

As shown in FIG. 1 to FIG. 4, a conversion arm 28 is coupled to the upper end of the shaft 25 by means of two arms 32 and 34, so that it is rotatable but not movable axially (vertically). The lower arm 34 has a pin 37 studded on the upper surface in parallel with the shaft 25 and a coil spring 30 is wound around the pin 37. Both ends 43a and 43b of the coil spring 30 abut against flattened faces 38a, 38b (38b not illustrated) formed by cutting opposing circumferential sides of the shaft 25, so that the conversion arm 28 is usually kept from rotation relative to the shaft 25.

A connection arm 39 supported rotatably at the back of the mirror 1 comprises a vertical lever 39a and a leg 39b that extends horizontally from the center of the vertical lever 39a. A ball pivot 40a disposed to the extended end of the leg 39b is pivoted to an intermediate connection portion 33 of the conversion arm 28. Ball pivots 40b and 40c disposed on both ends of the vertical lever 39a are supported at the back of the mirror holder 2 in symmertrical with each other with respect to the horizontal shaft X. Accordingly, when the shaft 25 moves upward, the leg 39b moves upward by way of the conversion arm 28 and, as a result, the vertical lever 39a leans forward to incline the mirror 1 forward. The mirror 1 can be inclined also backward in the manner opposite to that mentioned above by moving the shaft 25 downward. Further, the mirror 1 can be inclined rightward or leftward by the rotation of the shaft 25. That is, when the shaft 25 rotates clockwise in FIGS. 3, 4, the conversion arm 28 follows it and also rotates clockwise. Since, this exerts a force on the conversion arm 28 for attracting the connection arm 39. The mirror 1 is inclined counter clockwise around the vertical axis Y. The mirror 1 is inclined clockwise in the manner opposite to that mentioned above by the rotation of the shaft 25 in the counter clockwise direction in FIGS. 3, 4.

Description will now be made to the sequential procedures for assembling the manually operated remote control type door mirror of this embodiment.

First, as shown in FIG. 1, the flanged portion 9a of the cylindrical member 9 is combined in the recess 65 on the side of the base unit 60 and, at the same time, the ball pivot 27 at the extended end of the lower end arm 29 exposed below the flanged portion 9a on the side of the bracket unit 61 is connected with the cylindrical bore 51 of the swing lever 15 exposed to the inside of the recess 65. Then, the bolts 66 and 67 are screwed from below the base 6a into the flanged portion 9a thereby fixing the portion 9a to the recess 65. Then, the mirror visor 3 and the mirror holder 2 (together with the mirror 1) are mounted to the bracket 31 (refer to FIG. 2).

Since the bracket unit 61 is assembled with the base unit 60, by connecting the lower end arm 29 on the side of the bracket unit 61 with the swing lever 15 on the side of the base unit 60, the operation efficiency for assembling the link mechanism can be improved as compared with that in the prior art. Further, in this embodiment, since the bracket unit 61 can be replaced while leaving the base unit 60 being mounted as it is to the car body, constituent parts can be exchanged more easily.

In alternative assembling procedures, it is possible to previously mount the mirror visor 3 and the mirror holder 2 to the bracket 31 and then mount the bracket unit 61 to the base unit 60.

Description will be made to the operation of inclining the manually operated remote control type door mirror in this embodiment.

When the manipulation lever 12 is manipulated rightward (in the direction of an arrow C in FIG. 4), the swing lever 15 rotates counter clockwise around the fulcrum ball 16 and the axial center of the vertical rod 14 as the center. In this operation, the vertical rod 14 is kept from tilting to the direction of the arrow C by the guide groove 17a disposed above and apart from the fulcrum ball 16. The ball pivot 27 displaces leftward by the rotation of the swing lever 15 (in the direction of arrow C1 in FIG. 4). In accordance therewith, the lower end arm 29 moves to rotate the shaft 25 clockwise (in the direction of arrow CII in FIG. 4). The rotational operation of the shaft 25 is transmitted by way of the coil spring 30 to the conversion arm 28, by which the conversion arm 28 is rotated in the same direction as that of the shaft 25. Since this attracts the connection arm 39, the mirror 1 supported by the ball pivot 4 is inclined counter clockwise around the vertical shaft Y (in the direction of arrow CIII in FIG. 4). In a similar way, when the manipulation lever 12 is operated leftward (in the direction of an arrow D in FIG. 4), the shaft 25 rotates counter clockwise (in the direction of an arrow DII in FIG. 4), and the mirror 1 is inclined clockwise around the vertical shaft Y (in the direction of an arrow DIII in FIG. 4). Then, when the manipulation rod 12 is operated downward (in the direction of an arrow B in FIG. 4), the vertical rod 14 rotates downward around the fulcrum ball 16 as the center. In this operation, since the guide groove 17a is opened at one end, the movement of the vertical portion 14a of the vertical rod 14 above the fulcrum ball 16 is not hindered by the wall surface of the guide groove 17a but the manipulation rod 12 rotates by a predetermined angle in the direction of the arrow B. By the rotation of the vertical rod 14, the swing lever 15 moves upward around the fulcrum ball 16 as the center and the ball pivot 27 also displaces in the direction of the arrow BI in FIG. 4. Along with this movement, the lower end arm 29 moves upward to move the shaft 25 also upward (in the direction of an arrow BII in FIG. 4). The upward movement of the shaft 25 is transmitted by way of the conversion arm 28 to the ball pivot 40a as the upward movement, by which the mirror 1 is inclined forward around the horizontal axis X (in the direction of an arrow BIII in FIG. 4). In a similar manner, when the manipulation rod 12 is operated upward (in the direction of an arrow A in FIG. 4), the shaft 25 moves downward (in the direction of an arrow AII in FIG. 4) and the mirror 1 is inclined backward along the horizontal axis X (in the direction of an arrow AIII in FIG. 4).

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. A manually operated remote control type door mirror adapted to tilt a mirror by an operation applied to an manipulation lever from the inside of a vehicle, CHARACTERIZED by providing a base unit and a bracket unit which are separate from each other and can be assembled integrally, wherein the base unit comprises an attaching stay to be attached on the side of a door of a vehicle body, a base extended from the attaching stay and having a recess opened outward, a manipulation lever supported turnably to the attaching stay with one end of the lever being protruded to the inside of the vehicle body and with the other end of the lever being exposed to the inside of the recess of the base, and the bracket unit comprises a cylindrical member having one end that can be received in the recess of the base, a shaft mounted to the cylindrical member rotatably and axially movably with one end thereof being led out from the cylindrical member, a bracket supported on the cylindrical member, and a mirror tiltably held to the bracket and connected by way of a link mechanism to the other end of the shaft, whereby the bracket unit can be assembled with the base unit by placing one end of the cylindrical member in the recess of the base while connecting the other end of the shaft to the other end of the manipulation lever.

2. A door mirror as defined in claim 1 characterized in that the manipulation lever comprises a manipulation rod protruded at an upper end to the inside of the vehicle body and a swing rod exposed at a lower end of the inside of the upward open recess of the base and the manipulation rod and said swing rod are connected to each other by way of a fulcrum ball.

3. A door mirror as defined in claim 1, characterized in that the cylindrical member of the bracket unit is a tubular cylindrical member flanged at the lower end so as to be received in the upward open recess of the base unit.

4. A door mirror as defined in claim 1, characterized in that the shaft protrudes downward from the flanged portion of the cylindrical member and has a ball pivot at one end to be joined with a cylindrical bore formed in the lower end of the swing rod.

5. A door mirror as defined in claim 1, characterized in that the link mechanism comprises a conversion arm attached to the shaft rotatably but not vertically movably so as to transmit the movement of the manipulation lever to the bracket.

* * * * *